United States Patent
Lehmann et al.

(10) Patent No.: US 9,032,287 B2
(45) Date of Patent: May 12, 2015

(54) SYSTEMS AND METHODS OF MODIFYING A WEB PAGE BASED ON ENVIRONMENTAL FACTORS

(75) Inventors: Doron Lehmann, Kfar Vradim (IL); Eyal Nathan, Tel-Aviv (IL); Nimrod Barak, Nes Tziona (IL)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 13/483,598

(22) Filed: May 30, 2012

(65) Prior Publication Data

US 2013/0326327 A1 Dec. 5, 2013

(51) Int. Cl.
*H04W 4/00* (2009.01)
*G06Q 30/02* (2012.01)

(52) U.S. Cl.
CPC ........ *G06Q 30/0241* (2013.01); *G06Q 30/0267* (2013.01)

(58) Field of Classification Search
CPC .................. G06Q 30/0241; G06Q 30/0267
USPC .......................... 715/234, 744, 861
See application file for complete search history.

(56) References Cited

U.S. PATENT DOCUMENTS

| | | | |
|---|---|---|---|
| 7,313,622 B2 * | 12/2007 | Lee et al. ................. | 709/227 |
| 7,627,648 B1 * | 12/2009 | Mehta et al. ............. | 709/217 |
| 2008/0214210 A1 * | 9/2008 | Rasanen et al. .......... | 455/456.3 |
| 2009/0172035 A1 * | 7/2009 | Lessing et al. ........... | 707/104.1 |
| 2011/0238503 A1 * | 9/2011 | Naini ....................... | 705/14.66 |
| 2012/0079018 A1 * | 3/2012 | Rottler et al. ............. | 709/204 |

* cited by examiner

*Primary Examiner* — Scott Baderman
*Assistant Examiner* — Hassan Mrabi
(74) *Attorney, Agent, or Firm* — Buckley, Maschoff & Talwalkar LLC (57) ABSTRACT

According to some embodiments, a method and apparatus are provided to receive an environmental factor associated with a mobile device. A web page to be viewed on the mobile device is modified based on the determined environmental factor.

14 Claims, 7 Drawing Sheets

700

| Title Area 702 | Physical Area 704 | Distance From Physical Area (Km) 706 | Title Area Change 708 |
|---|---|---|---|
| NFL Homepage | Miami | 20 | Dolphins Colors |
| NFL Homepage | Denver | 50 | Broncos Colors |
| Tickets Page | Miami | 20 | Dolphins Image |

| Title Area 702 | Physical Area 704 | Distance From Physical Area (Km) 706 | Title Area Change 708 |
|---|---|---|---|
| NFL Homepage | Miami | 20 | Dolphins Colors |
| NFL Homepage | Denver | 50 | Broncos Colors |
| Tickets Page | Miami | 20 | Dolphins Image |

FIG. 7

SYSTEMS AND METHODS OF MODIFYING A WEB PAGE BASED ON ENVIRONMENTAL FACTORS

BACKGROUND

Branding relates to the marketing of a specific product, product line, company or brand. A web page or a web portal (e.g., a web site that combines information from a variety of different sources in a single web page), may be branded to promote a company or product associated with the web portal.

Many users view web pages via mobile devices (e.g., tablets or cellular phones). However, viewing and interacting with a web page on a mobile device can sometimes be difficult. For example, when viewing a web page portal in a dark room, the light from a web page may be disturbing to those who are also in the room and the bright light may it difficult to view the web page. In these instances, a user may need to leave the room to view the web page. Likewise, in bright daylight a web page may be difficult to view on a mobile device.

DETAILED DESCRIPTION

Figure 1:
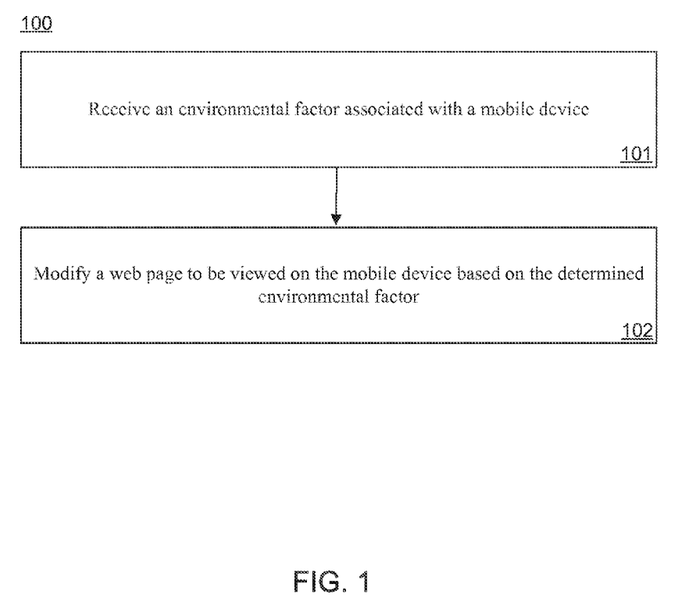
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 5. The method 100 may relate to the management of web page branding while the web page is viewed via a mobile device.

At 101, an environmental factor associated with a mobile device may be received. The environmental factor may be received at a web server such as that described with respect to FIG. 4 and FIG. 5. Environmental factors may comprise, but are not limited to, an amount of available light detected or measured by the mobile device or a determination of a physical/geographic location of the mobile device. The determination of the physical location of the mobile device may also be associated with a range or distance (e.g., km) from a physical location stored in a database.

In one embodiment, if the amount of visible or available light detected by the mobile device is greater than a predefined threshold (e.g., a predefined amount of lumens), the mobile device may send an indication to a web server to indicate the amount of light determined by the mobile device. If the indication is that the light is greater than the predefined amount, then a first web page design may be implemented. However, if the indication is that the light is less than the predefined amount, then a second web page design may be implemented.

In another embodiment, the mobile device may send a level of available light (e.g., in lumens) to the web server. In response to receiving the level of available light, the web server may make a determination as to whether the amount of light exceeds a predetermined threshold. Furthermore, the web server may change the web page based on the determination.

In some embodiments, a difference between the first web page design and the second web page design may comprise using a different color palette for the web page (e.g., a different color palette for the text and background colors). A color palette may comprise a defined set of colors for the management of digital images. Therefore, a color palette of the web page may be changed based on the amount of visible light that is detected.

Figure 2:
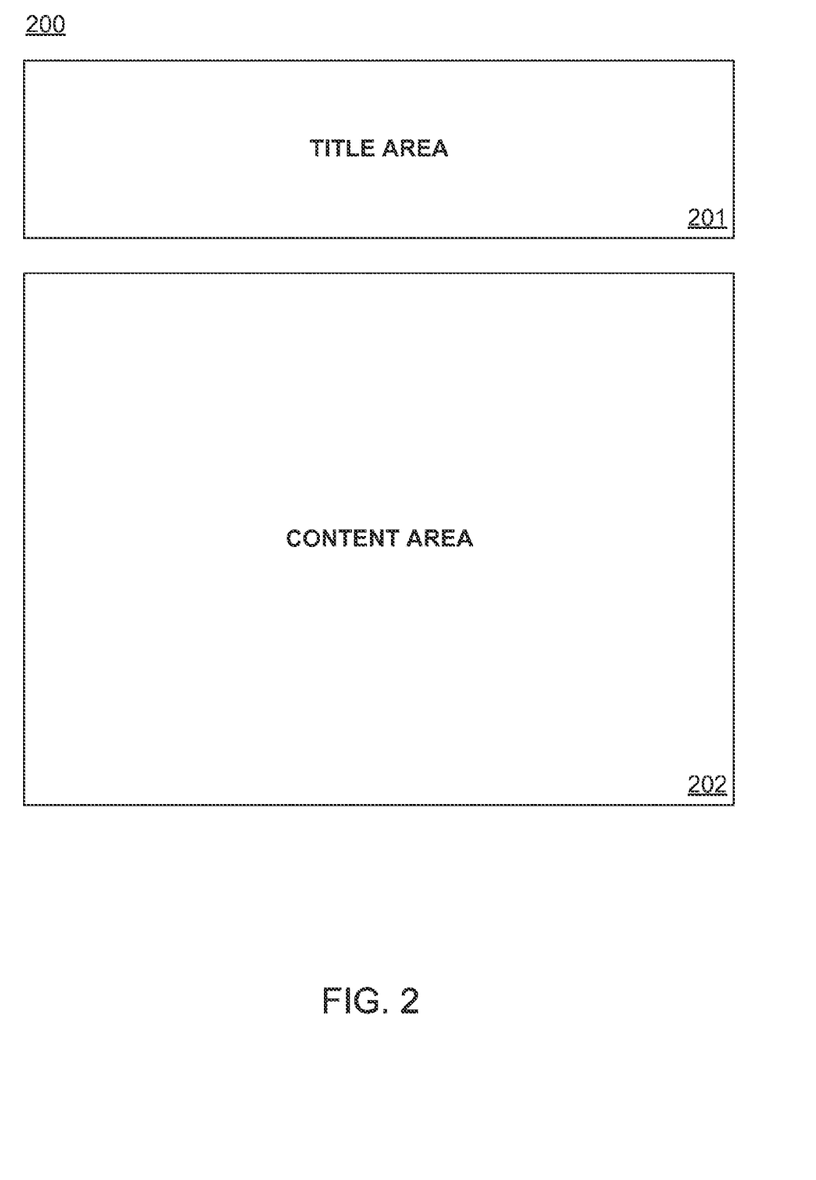
FIG. 2 illustrates a web page according to some embodiments.

Now referring to FIG. 2, a web page 200 may comprise a title area 201 and a content area 202. The title area 201 may be associated with a brand or slogan of a company associated with the web page. For example, the web page may be associated with the National Football League and the title area 201 may illustrate the name of the company (e.g., "National Football League") in a first color from the color palette, such as, but not limited to black.

The content area 202 may comprise information associated with the web page, such as, for example, information associated with the company associated with the web page. For example, the National Football League may provide content associated with schedules, league information, ticket sales, etc. The content area 202 may comprise a same color palette as the title or may comprise a different color palette.

For illustrative purposes, and to aid in understanding features of the specification, some examples will now be introduced. These examples are not intended to limit the scope of the claims.

In a first example, a user views a web page associated with the "National Football League" on his mobile device while the user is outside on a sunny day. The mobile device, by using a built in camera, or other light sensor, determines an amount of light being received at the mobile device. As part of a network packet sent from the mobile device to retrieve a web page, the mobile device sends an indication of an amount of light being received at the mobile device. The web server may determine if the received amount of light is greater than a predetermined threshold of light. However, in this example, the user then views the "National Football League" web page on his mobile device after he moves inside a house that has very little ambient light. The mobile phone then determines a change in an amount of received light.

In a second example, a user views a sports league web page, such as the "National Football League" web page on his mobile device while the user is located in Miami, Fla. The name of the Miami football team is the Dolphins. The mobile device, by using a built in GPS, a location indication received via a cell tower, a WIFI address, and/or via a geolocation html tag, transmits a location of the mobile device to a web server. As part of a network packet sent from the mobile device to the web server to retrieve the web page, the mobile device sends a location of the mobile device. In this second example, the title area 201 of the web page may display "National Football League" however the color palette of the web page may correspond to the color scheme of the Miami Dolphins' (e.g., their uniform colors) and/or an image corresponding to the Miami Dolphins may be displayed since the mobile device is located within the vicinity of Miami, Fla. (e.g., within a defined range from Miami, Fla.). However, the user then flies to Denver, Colo. and views the "National Football League" web page on his mobile device where the name of the Denver football team is the Broncos.

Referring back to FIG. 1, at 102, a web page to be viewed on the mobile device is modified by a processor. The web page is modified based on the determined environmental factor. Modification of the web page may comprise changing a color palette associated with the web page. For example, text that was displayed in a first color may be displayed in a second color after the modification. Furthermore, a background color may be changed from a third color to a fourth color after the modification. A graphic image may also be changed based on the determined environmental factor.

Figure 3:
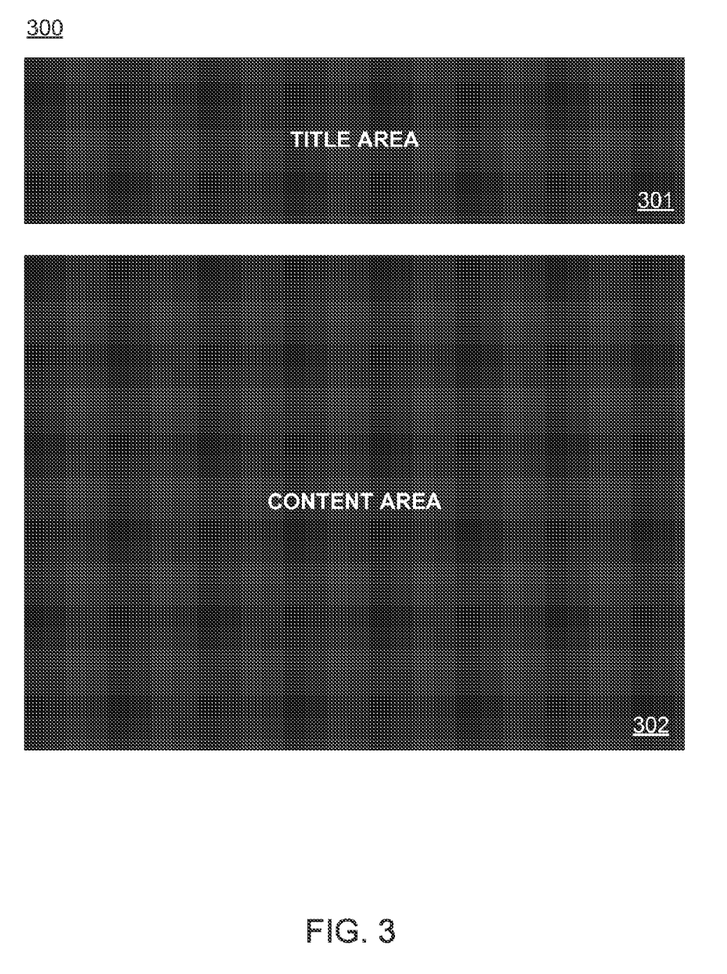
FIG. 3 illustrates a web page according to some embodiments.

Continuing with the above-mentioned examples, in the first example the user viewed the "National Football League" web page on his mobile device after he moved inside a house with low ambient light. The mobile device, by using a built in camera, or other light sensor, determines that amount of light being received at the mobile device has been reduced. After the mobile device sends an indication that the amount of light being received has changed, the web server presents the web page to the user however the web page is presented using a different color palette (e.g., the web page comprises a different arrangement of colors). Take for example the web page 300, as illustrated in FIG. 3. The web page 300 may comprise the same title area 301 and content 302 but the color palette may have changed. For example, given a color palette that comprises two colors, black and white, as illustrated in FIG. 3, the fonts have been changed from black to white and the background has been changed from white to black. By changing the background and front color, a web page may be more easily read in certain environments (e.g., indoors or outdoors). For example, a darker background color may be more conducive to viewing a web page in a low light situation while a lighter background color may be more conducive to viewing a web page in a brighter light situation.

Continuing with the second example, after the user flies to Denver, Colo. and views the "National Football League" web page, the mobile device may transmit a location of the mobile device to the web server. In response to receiving the location, the web server may change a color palette of the web page to a color palette associated with the team colors of the Denver Broncos. Furthermore, an image corresponding to the Denver Broncos may be displayed. In some embodiments, instead of the mobile device transmitting a location of the mobile device, the web server that receives a request to view the web page may determine the location of the mobile device via an IP address contained within the request from the mobile device to view the web page. While a title area may be changed, the content portions of the "National Football League" web page may not be changed. Therefore, modifying the web page to be viewed based on the geographic location may comprise changing at least a portion of the web page to reflect the detected location.

Figure 4:
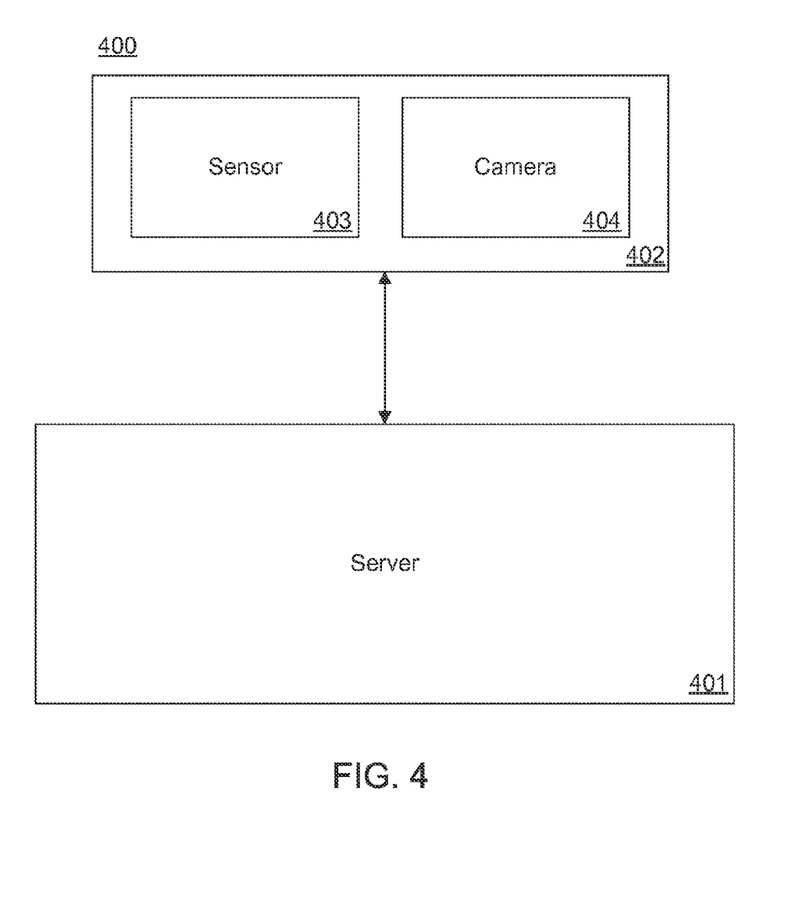
FIG. 4 illustrates a system according to some embodiments.

Now referring to FIG. 4, an embodiment of a system 400 is illustrated. The system 400 may comprise a server 401 and a mobile device 402. The server 401 may be described with respect to FIG. 5. The mobile device comprises a sensor 403, a camera 404 and may be further described with respect to FIG. 6. The sensor 403 may comprise a light sensor, atmospheric pressure sensor, GPS or other sensor that may be used to determine environmental factors. The camera 404 may comprise a digital camera. In some embodiments, the camera 404 may sense an amount of light received at a camera lens.

Figure 5:
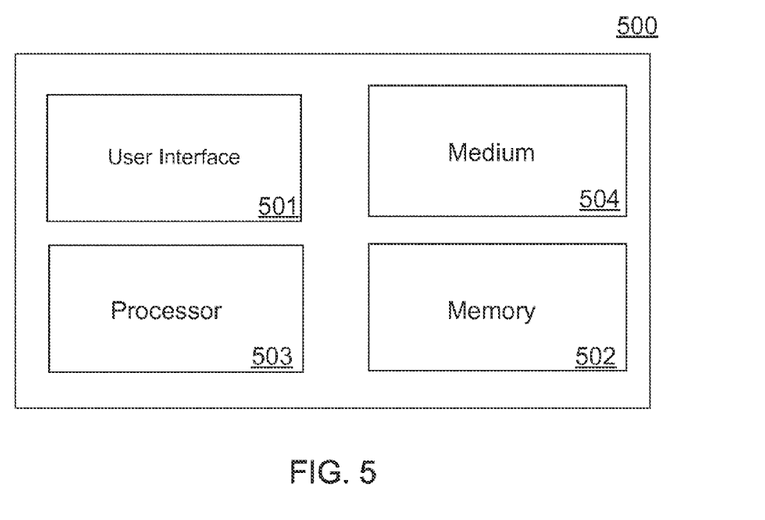
FIG. 5 illustrates a computing system according to some embodiments.

Now referring to FIG. 5, an embodiment of an apparatus 500 is illustrated. The apparatus 500 may comprise a user interface 501, a main memory 502, a processor 503, and a medium 504. According to some embodiments, the apparatus 500 may further comprise a digital display port, such as a port adapted to be coupled to a digital computer monitor, television, portable display screen, or the like.

The user interface 501 may allow users to interact with the apparatus 500 using text commands or with images/graphical icons. In some embodiments, the user interface may comprise a keyboard, mouse, or associated port related thereto. Furthermore, the user interface 501 may comprise a display or a touch screen.

The main memory 502 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 502 may comprise a plurality of memory modules.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The medium 504 may comprise any computer-readable medium that may store processor-executable instructions to be executed by the processor 503. For example, the medium 504 may comprise a non-transitory tangible medium such as, but is not limited to, a compact disk, a digital video disk, flash memory, optical storage, random access memory, read only memory, or magnetic media.

Figure 6:
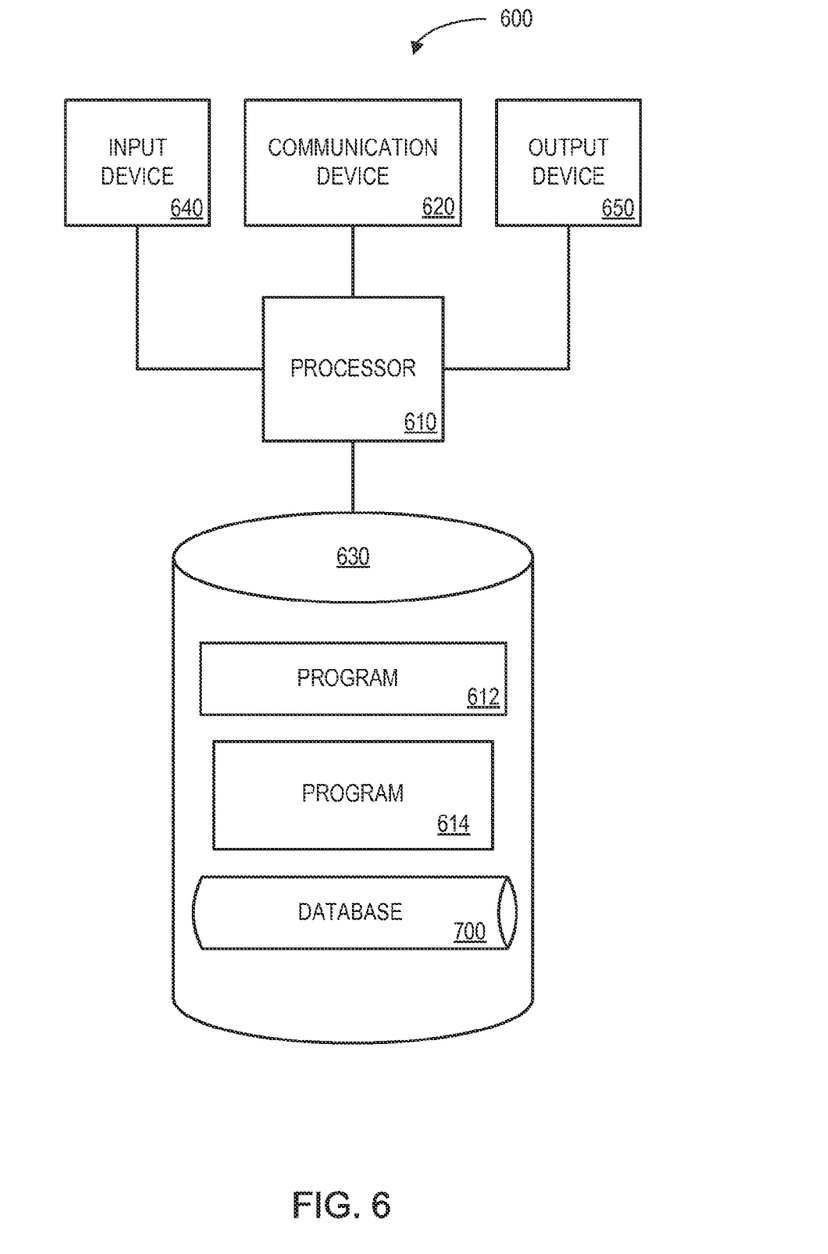
FIG. 6 is a block diagram of an apparatus according to some embodiments.

Now referring to FIG. 6, FIG. 6 is a block diagram overview of an apparatus 600 according to some embodiments. The apparatus 600 may be, for example, associated with a mobile device, such as a phone or tablet. The apparatus 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used, for example, as an input path to receive information about user roles. The apparatus 600 further includes an input device 640 (e.g., a touchscreen to navigate a webpage) and an output device 650 (e.g., a touchscreen to display a webpage).

The processor 610 communicates with a storage device 630. The storage device 630 may comprise any appropriate information storage device, including combinations of magnetic storage devices (e.g., a hard disk drive), optical storage devices, and/or semiconductor memory devices. The storage device 630 stores a program 612 and/or navigation platform 614 for controlling the processor 610. The processor 610 performs instructions of the programs 612, 614, and thereby operates in accordance with any of the embodiments described herein. For example, the processor 610 may determine a screen resolution of the apparatus 600.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the apparatus 600 from another device; or (ii) a software application or module within the apparatus 600 from another software application, module, or any other source.

In some embodiments (such as shown in FIG. 6), the storage device 630 stores a database 700 (e.g., including information associated with the mobile device.). An example of a database that may be used in connection with the apparatus 600 will now be described in detail with respect to FIG. 7. Note that the database described herein is only an example, and additional and/or different information may be stored therein. Moreover, various databases might be split or combined in accordance with any of the embodiments described herein.

Figure 7:
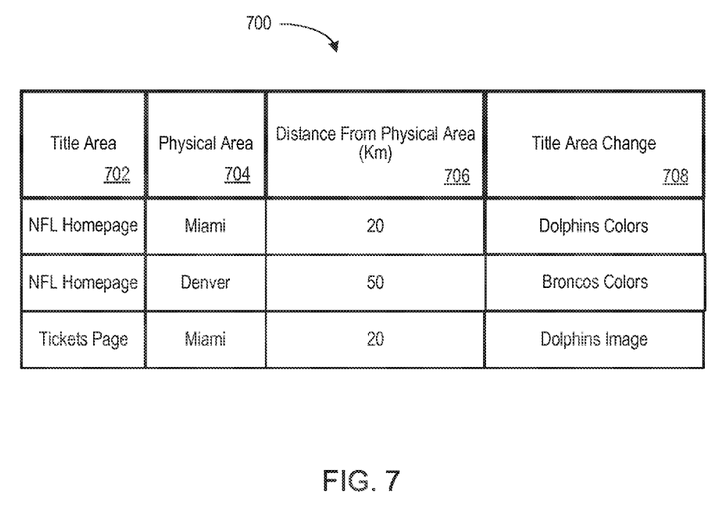
FIG. 7 illustrates a portion of a database that might be stored in accordance with some embodiments.

Referring to FIG. 7, a table is shown that represents a database 700 that may be stored locally at the apparatus 600 according to some embodiments or at a web server, such as apparatus 500, according to other embodiments. The table may include, for example, entries relating physical locations with specific branding (e.g., changes to a title area). The table may also define fields 702, 704, 706, 708 for each of the entries. The fields 702, 704, 706, 708 may, according to some embodiments, specify: a tile area 702, a physical area 704, a distance from the physical area 706, and a title area change 708. The information in the database 700 may be created and/or updated.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
   receiving, as part of a network packet sent from a mobile device to retrieve a web page associated with a sports league, an environmental factor associated with the mobile device, the environmental factor comprising a geographic location determined by the mobile device via a built in GPS, a location indication received via a cell tower, a wireless internet address or an html tag;
   determining a color pallet associated a sport team's uniform colors based on the geographic location determined by the mobile device, wherein the sports team is associated with the sports league and the determined geographic location; and
   modifying, via a processor, a first portion of a web page to be viewed on the mobile device by changing the web page to reflect the determined color pallet associated the sport team's uniform colors wherein the first portion is associated with a title area of the web page and a second portion of the web page to be viewed on the mobile device is associated with a content area of the web page.

2. The method of claim 1, wherein the environmental factor further comprises:
   an amount of visible light detected by the mobile device.

3. The method of claim 2, wherein modifying the web page to be viewed based on the amount of visible light detected by the mobile device comprises:
   changing a color palette of the web page based on the amount of detected visible light.

4. The method of claim 1, further comprising:
   leaving a second portion of the web page unchanged in response to determining the geographic location.

5. The method of claim 4, wherein the first portion is associated with a title area of the web page and the second portion is associated with a content area of the web page.

6. The method of claim 1, wherein the location specific element further comprises an image associated with the determined location.

7. The method of claim 6, wherein the image corresponds to the sports team.

8. The method of claim 1, wherein determining a color pallet associated a sport team's uniform colors based on the geographic location determined by the mobile device comprises:
   determining that the mobile device is within a defined range from a city associated with the sports team.

9. A non-transitory computer-readable medium comprising instructions that when executed by a processor perform a method, the method comprising:
   receiving, as part of a network packet sent from a mobile device to retrieve a web page associated with a sports league, an environmental factor associated with the mobile device, the environmental factor comprising a geographic location determined by the mobile device via a built in GPS, a location indication received via a cell tower, a wireless internet address or an html tag;
   determining a color pallet associated a sport team's uniform colors based on the geographic location determined by the mobile device, wherein the sports team is associated with the sports league and the determined geographic location; and
   modifying, via a processor, a first portion of a web page to be viewed on the mobile device by changing the web page to reflect the determined color pallet associated the sport team's uniform colors wherein the first portion is associated with a title area of the web page and a second portion of the web page to be viewed on the mobile device is associated with a content area of the web page.

10. The medium of claim 9, wherein the environmental factor further comprises:
    an amount of visible light detected by the mobile device.

11. The medium of claim 10, wherein modifying the web page to be viewed based on the amount of visible light detected by the mobile device comprises:
    changing a color palette of the web page based on the amount of detected visible light.

12. An apparatus comprising:
    a processor;
    a non-transitory computer-readable medium comprising instructions that when executed by the processor perform a method, the method comprising:
    receiving, as part of a network packet sent from a mobile device to retrieve a web page associated with a sports league, an environmental factor associated with the mobile device, the environmental factor comprising a geographic location determined by the mobile device via a built in GPS, a location indication received via a cell tower, a wireless internet address or an html tag;

determining a color pallet associated a sport team's uniform colors based on the geographic location determined by the mobile device, wherein the sports team is associated with the sports league and the determined geographic location; and modifying, via a processor, a first portion of a web page to be viewed on the mobile device by changing the web page to reflect the determined color pallet associated the sport team's uniform colors wherein the first portion is associated with a title area of the web page and a second portion of the web page to be viewed on the mobile device is associated with a content area of the web page.

13. The apparatus of claim 12, wherein the environmental factor further comprises:

an amount of visible light detected by the mobile device.

14. The apparatus of claim 13, wherein modifying the web page to be viewed based on the amount of visible light detected by the mobile device comprises:

changing a color palette of the web page based on the amount of detected visible light.

\* \* \* \* \*